April 13, 1926.

A. V. BROWN

MULTIFOCAL LENS

Filed April 28, 1923

1,580,282

INVENTOR
A. V. BROWN
BY Harry H. Styll.
ATTORNEY

Patented Apr. 13, 1926.

1,580,282

UNITED STATES PATENT OFFICE.

ANDREW V. BROWN, OF PHILADELPHIA, PENNSYLVANIA, ASSIGNOR TO AMERICAN OPTICAL COMPANY, OF SOUTHBRIDGE, MASSACHUSETTS, A VOLUNTARY ASSOCIATION OF MASSACHUSETTS.

MULTIFOCAL LENS.

Application filed April 28, 1923. Serial No. 635,193.

*To all whom it may concern:*

Be it known that I, ANDREW V. BROWN, a citizen of the United States, residing at Philadelphia, in the county of Philadelphia and State of Pennsylvania, have invented certain new and useful Improvements in Multifocal Lenses, of which the following is a specification.

This invention relates to improvements in multifocal lenses or lenses having a plurality of portions of different focal values respectively intended for vision at different distances, as for distance, for reading and for intermediate use as in looking at the ground or at relatively near objects.

Objects of the invention are to facilitate vision and eliminate the difficulties experienced with ordinary bifocals in which a clear image in proper position of stairs or the like cannot ordinarily be secured through the lower portion of the lens; to properly correlate the several visual fields of the lens for most efficient use; to permit of variance of one of the factors of the lens while maintaining the other factors constant; and to attain the foregoing through the use of a new and novel method or process of manufacture.

In its broadest aspect, the invention comprises a main lens or body portion having a segment or wafer secured thereto to increase its power through the wafer and having a second segment or wafer of greater area than the first secured in overlapping relation to the first on either the same side or the opposite side of the body portion and serving to increase or decrease the combined power of the body and first wafer and to provide a portion surrounding the first wafer of different focal value from either the body or body and segment combined.

In a more specific aspect, the invention comprises a body portion of one index of refraction having a countersink formed therein, and a button of a different index of refraction secured in the countersink, either temporarily as by cement, or most specifically, permanently united therewith by fusion. The united parts are formed with a smooth and unbroken surface, while secured to the body portion and overlying or overlapping the segment bearing portion thereof, and disposed either on the segment bearing face of the lens or body portion or on the opposite face thereof is a protuberance of greater area than the button. This protuberance may be either formed integral with the body portion or may be a wafer cemented in place thereon, but in either event serves to modify the power of the lens through the segment or button and to provide a circumscribing portion of an intermediate focal value. When cemented on the wafer may be changed to increase or decrease the reading or near vision and the intermediate vision focal values while continuing to use the same body portion and segment.

Certain embodiments of the invention are shown in the accompanying drawings, in which.

Figure 1:
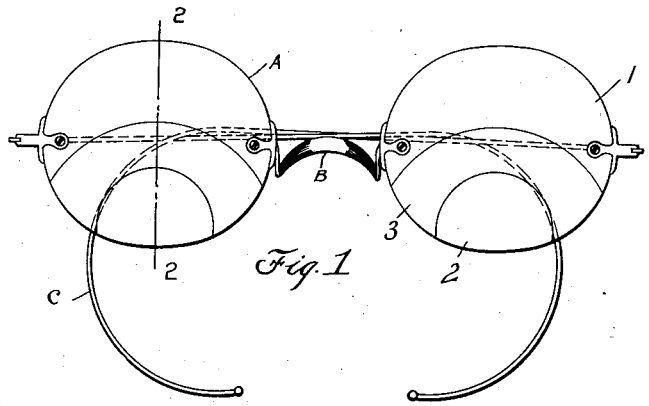
Figure 1 is a front view of a mounting equipped with the lenses of the invention.

In the drawings, A designates a spectacle frame having the bridge B and retaining temples C.

Mounted in the frame are a pair of the lenses of the present invention, said lenses including a main or body portion 1, a small near vision field 2 at its lower edge, and a larger segmental intermediate vision portion 3, the intermediate vision portion overlying the near vision portion and extending upwardly and laterally therefrom.

Figure 2:
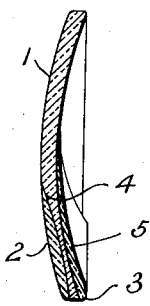
Figure 2 is a section of a lens of the invention taken as on the line 2—2 of Figure 1.
Figure 3:
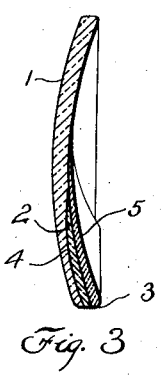
Figure 3 is a similar section of a different form.

In the production of such lenses, the body portion is preferably first formed with a recess or countersink as at 4 into which a suitably shaped button or segment 2 is secured by either cementing or by fusion, the surface of the body portion and exposed portion of the segment being then finished to a single smooth and continuous curve. This embedded segment may be placed on either the convex or the concave surface of the major lens or body portion, being shown in one location in Figure 2 and in the opposite location in Figure 3. It is to be understood that the body portion and segment are of different indices of refraction, the former for example having an index of 1.52 and ordinarily being of crown glass, while the latter is of flint having for example an index of 1.63. The lens therefor has one power in the main or distance vision portion, and an increased power through the segment.

To produce the final power in the reading portion of the lens, together with an intermediate vision field the wafer or segment portion 5 is then applied and preferably secured in place by cement to permit of its ready attachment and removal or replacement as desired. This allows the manufacturer to produce a bifocal blank which the prescription dealer can make into a trifocal by cementing on a segment to give the desired intermediate power in the well known method used in prescription work for making so-called cement bifocals, this procedure being of great advantage to the prescription dealer, and facilitating service to the patient, as such a trifocal may be readily prepared by the prescription dealer. This wafer is shown as having an arcuate knife edge and having one face of curvature to conform to and fit the surface of the major portion of the lens to which it is to be applied and having its other face formed with a more positive curve so that the power through the lens will be increased by its attachment.

Figure 4:
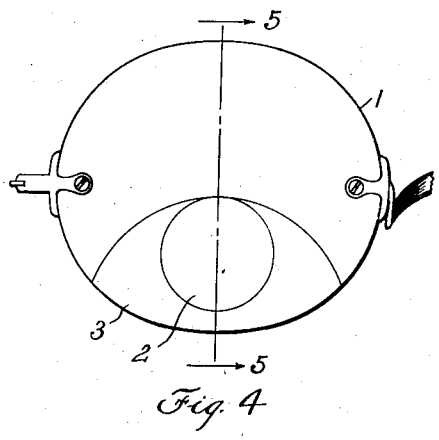
Figure 4 is a front view of a modified form of lens.
Figure 5:
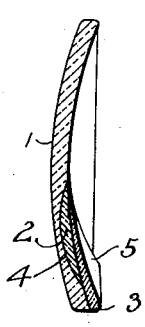
Figure 5 is a section on line 5—5 of Figure 4.

In the modification illustrated in Figure 4 the near vision field 2 is circular in shape and tangent to the intermediate field 3 at its upper edge, a portion of the intermediate field lying below the near vision field.

Figure 6:
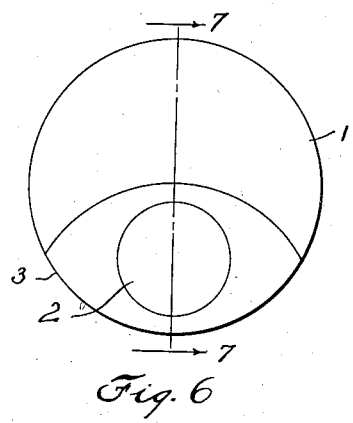
Figure 6 is a front view of another modification.
Figure 7:
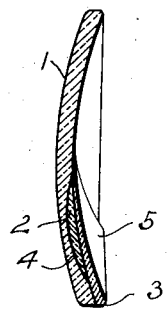
Figure 7 is a section on line 7—7 of Figure 6.

The form of lens shown in Figure 6 differs from the others in that the near vision field 2 is completely surrounded by the intermediate vision field.

In the improved bifocal illustrated and described the power through the near vision portion is determined by the power of the distance field plus the inherent power addition produced by the embedded segment plus the added power of the wafer, while surrounding the near vision field and particularly laterally thereof and therebeneath in the finished lens is the intermediate vision field especially useful to a person in ascending or descending steps, to a business man in looking over his desk, or to an outdoor enthusiast as in addressing the ball in golf. The power of this portion is the summation of the power of the distance field and that of the wafer. It will thus be seen that the power of both the near and intermediate vision fields may be readily varied without affecting that of the distant vision field by varying the power of wafer 5.

As the power of the wafer is determined independently of that of the major lens or segment, it may be formed of glass of the same index as either of the parts or of a different index as may prove most expedient. Also it may be secured in overlapping relation to the segment on either the segment bearing face or the opposite face of the major lens, and may either have its inner or as worn upper edge in a common tangent plane with that of the segment, or may extend beyond said edge of the segment, the former being preferable as insuring direct transition from the distant to the near vision fields of the lens without the necessity of passing through the intermediate vision portion, so that the lens is ordinarily used in the same manner as an ordinary bifocal, but has the advantage of the additional or third vision field in proper position for use in glancing sidewards or downwards, the two occasions when intermediate vision is ordinarily desired.

I claim:—

In a device of the character described, a body portion adapted for distant vision having a recess in one face, a second portion of different index of refraction secured in the recess and a third portion of index of refraction different from the segment secured to the first portion and overlying the segment, the vision through the combined third and first portions being adapted for intermediate distance, and vision through the combined three portions in line with the segment being adapted for near distance.

ANDREW V. BROWN.